United States Patent [19]
Pechhold et al.

[11] Patent Number: 5,945,493
[45] Date of Patent: Aug. 31, 1999

[54] FLUORINE-CONTAINING MALEIC ACID TERPOLYMER SOIL AND STAIN RESISTS

[75] Inventors: Engelbert Pechhold, Chadds Ford, Pa.; Peter Michael Murphy, Ooltewah, Tenn.

[73] Assignee: E. I. du Pont de Nemours and Company, Wilmington, Del.

[21] Appl. No.: 09/099,990

[22] Filed: Jun. 19, 1998

[51] Int. Cl.⁶ .................................. C08F 12/30
[52] U.S. Cl. ........................ 526/243; 526/247; 442/93
[58] Field of Search .................. 526/243, 247; 442/93

[56] References Cited

U.S. PATENT DOCUMENTS

| | | | |
|---|---|---|---|
| Re. 33,365 | 10/1990 | Blyth et al. | 428/97 |
| 3,844,827 | 10/1974 | Wasley et al. | 526/247 |
| 3,897,206 | 7/1975 | Kearney | 8/120 |
| 4,029,867 | 6/1977 | Wasley et al. | 526/247 |
| 4,038,027 | 7/1977 | Kearney | 8/120 |
| 4,144,026 | 3/1979 | Keller et al. | 8/115.6 |
| 4,623,683 | 11/1986 | Villarreal et al. | 524/47 |
| 4,883,839 | 11/1989 | Fitzgerald | 525/136 |
| 5,520,962 | 5/1996 | Jones, Jr. | 427/393.4 |
| 5,654,068 | 8/1997 | Pechhold | 252/8.62 |
| 5,670,246 | 9/1997 | Pechhold et al. | 428/267 |
| 5,707,708 | 1/1998 | Pechhold | 428/96 |
| 5,770,656 | 6/1998 | Pechhold | 525/326.4 |

FOREIGN PATENT DOCUMENTS 0 306 992  3/1989  European Pat. Off.

*Primary Examiner*—James J. Bell

[57] ABSTRACT

A terpolymer having units of Formula I

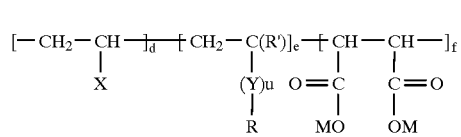

wherein
X is a $C_{2-10}$ alkyl, $C_{6-12}$ aryl, or $C_{4-12}$ alkoxy radical,
d is from about 3 to about 50,
R is a fluoroalkyl radical $R_f(A)_v$—$(B)_w$—,
$R_f$ is a fully fluorinated straight or branched aliphatic radical optionally interrupted by at least one oxygen atom,
A is a divalent radical selected from —$SO_2N(R")$—, —$CON(R")$—, —S—, or —$SO_2$—, where R" is H, or a $C_{1-6}$ alkyl radical,
B is a divalent linear hydrocarbon radical -$C_tH_{2t}$-, where t is 1 to 12,
Y is a divalent radical —$CH_2$—O—,
u, v, and w are each independently zero or 1,
R' is hydrogen or methyl,
e is from about 0.05 to about 10,
M is hydrogen, alkali metal, or ammonium, and
f is from about 5 to about 40,
and its use to provide soil resistance and resistance to staining by acid dyes for fiber substrates is disclosed.

6 Claims, No Drawings

FLUORINE-CONTAINING MALEIC ACID TERPOLYMER SOIL AND STAIN RESISTS

BACKGROUND OF THE INVENTION

Stain resist compositions based on hydrolyzed maleic anhydride polymers provide stain resistance towards acid dyes when applied from low pH aqueous solutions onto polyamide fibers. However, the fibers require a further treatment in an additional step with a fluorochemical dispersion to prevent soiling. This additional step can be costly since it requires application equipment and heating. To circumvent the additional costs, attempts have been made to modify maleic anhydride polymers by partial esterification with fluoroalcohols or fluorothiols as described by Pechhold and Murphy in U.S. Pat. No. 5,670,246. However, a drawback of this approach is the limited stability of the fluoroesters in low pH of less than about 2 in aqueous application baths.

Copolymers of non-hydrolyzable perfluoroalkyl monomers with maleic anhydride have been described by Pittman et al. in U.S. Pat. Nos. 3,844,827 and 4,029,867, and by Bildhauer et al. in Canadian Application 2,148,998. These fluorinated maleic acid polymers provide antisoil properties, but, they are unacceptable as anti-stain compositions.

There is thus a need for fluoropolymers which can be introduced into other polymer matrices to lower the surface energy and thus provide simultaneous soil and stain resistance in a single application step. The present invention provides such a polymer.

SUMMARY OF THE INVENTION

The present invention comprises a composition comprising a terpolymer having units of Formula I

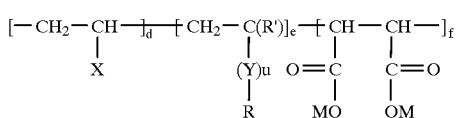

I wherein
X is a $C_{2-10}$ alkyl, $C_{6-12}$ aryl, or $C_{4-12}$ alkoxy radical,
d is from about 3 to about 50,
R is a fluoroalkyl radical $R_f(A)_v$—$(B)_w$—,
$R_f$ is a fully fluorinated straight or branched aliphatic radical optionally interrupted by at least one oxygen atom,
A is a divalent radical selected from —$SO_2N(R'')$—, —$CON(R'')$—, —S—, or —$SO_2$—, where R'' is H, or a $C_{1-6}$ alkyl radical,
B is a divalent linear hydrocarbon radical —$C_tH_{2t}$—, where t is 1 to 12,
Y is a divalent radical —$CH_2$—O—,
U, v, and w are each independently zero or 1,
R' is hydrogen or methyl,
e is from about 0.05 to about 10,
M is hydrogen, alkali metal, or ammonium, and
f is from about 5 to about 40.

The present invention further comprises a method of providing soil resistance and resistance to staining by acid dyes to fiber substrate comprising application in a single step of an effective amount of a composition of a terpolymer having units of Formula I as defined above.

The present invention further comprises a fiber to which has been applied a composition of a terpolymer having units of Formula I as defined above.

The composition of the present invention for providing stain and soil resistance comprises hydrolyzed maleic anhydride terpolymers as shown above in Formula I prepared from aliphatic/aromatic alpha olefins or alkyl vinyl ethers, small limited amounts of a non-hydrolyzable perfluoroalkyl substituted monomer, and maleic anhydride. The amount of the non-hydrolyzable perfluoroalkyl substituted monomer should not exceed 0.25 mole per mole of maleic anhydride. The hydrolyzed terpolymers are completely water soluble and will absorb at low pH of less than about 3 from the aqueous solution onto the fiber surface.

DETAILED DESCRIPTION OF THE INVENTION

The present invention comprises a composition which provides both stain resistance and soil resistance to polyamide, polyester, polyolefin and wool fibers such as carpets. The composition of the present invention is applied to the substrate in a single application step instead of the usual separate steps used at the textile or carpet mill to apply a stain resist composition and a soil resist composition. The composition of the present invention is a hydrolytically stable perfluoroalkyl-substituted terpolymer which overcomes the shortfalls of earlier attempts to apply a single composition to achieve both stain resistance and soil resistance.

The present invention comprises terpolymers which, after hydrolysis, provide both soil and stain resistance to fibers. The terpolymers are formed by polymerization of the following monomers 1) an aliphatic or aromatic alpha olefin or an alkyl vinyl ether, 2) a non-hydrolyzable perfluoroalkyl substituted monomer, and 3) maleic anhydride.

This invention comprises novel maleic acid terpolymers with perfluoroalkyl side chains of the structure of Formula I shown below which provide both soil and stain resistance to fibers in a single step application.

Formula I

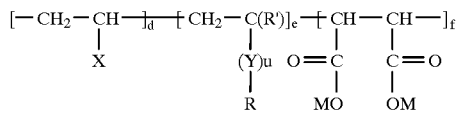

wherein
X is a $C_{2-10}$ alkyl, $C_{6-12}$ aryl, or $C_{4-12}$ alkoxy radical,
d has a value in the range of from about 3 to about 50,
R is a fluoroalkyl radical $R_f$—$(A)_v$—$(B)_w$—,
$R_f$ is a fully fluorinated straight or branched aliphatic radical optionally interrupted by at least one oxygen atom,
A is a divalent radical selected from —$SO_2N(R'')$—, —$CON(R'')$—, —S—, or —$SO_2$—, wherein R'' is H, or a $C_{1-6}$ alkyl radical,
B is a divalent linear hydrocarbon radical —$C_tCH_{2t}$—, where t is 1 to 12,
Y is a divalent radical —$CH_2$—O—,
u, v, and w are independently the same or different and are zero or 1,
R' is hydrogen or methyl,
e is from about 0.05 to about 10, M is hydrogen, alkali metal, or ammonium, and f has a value in the range of from about 5 to about 40.

Preferably the precursors of the terpolymers of Formula I (before hydrolysis of the maleic anhydride ring) have molar ratios of alkyl vinyl ether or alpha-olefin to maleic anhydride of from about 0.6:1 to about 1.2:1, and of non-hydrolyzable perfluoroalkyl substituted monomer to maleic anhydride of from about 0.01:1 to about 0.25:1. The number average molecular weights of these preferred maleic anhydride terpolymers are controlled conventionally by the use of chain transfer agents, as further described below, to the approximate range of 1,000 to 20,000.

The preferred terpolymers of Formula I have values of d of from about 5 to about 15, values of e of from about 0.1 to about 3, and values of e of from about 7 to about 20.

The hydrocarbon monomers useful in the preparation of the terpolymers of this invention are alkyl ($C_{2-10}$) vinyl ethers, and aliphatic ($C_{4-12}$) or aromatic ($C_{8-14}$) alpha olefins. Representative examples of preferred monomers are listed below by way of illustration and not limitation: isobutylene, 1-decene, methylstyrene, phenylstyrene, hexyl vinyl ether, and octyl vinyl ether. Most preferred hydrocarbon monomers are: I-hexene, 1-octene, styrene, and butyl vinyl et her.

The fluorine-containing monomer used in the preparation of the terpolymers of the present invention is a non-hydrolyzable perfluoroalkyl substituted monomer. Preferably $R_f$ in this monomer contains at least 1 and not more than about 30 carbon atoms. Most preferably $R_f$ contains 4 to 16 carbon atoms. Representative preferred examples of these monomers prior to polymerization useful in the practice of the present invention are listed below:

$CnF_{(2n+1)}$—$CH=CH_2$, wherein n=4, 6, 8, 10, 12, and 14 or a mixture thereof, $CnF_{(2n+1)}$—$CH_2$—$CH=CH_2$, wherein n is as previously defined, $CnF_{(2n+1)}$—$(CH_2)_6$—$CH=CH_2$, wherein n is as previously defined, $C_8F_{17}$—$SO_2$—$NH$—$CH_2$—$CH_2$—$O$—$CH_2$—$CH=CH_2$, $C_8F_{17}$—$SO_2$—$N(CH_3)$—$CH_2$—$CH_2$—$O$—$CH_2$—$CH=CH_2$, $C_8F_{17}$—$SO_2$—$N(C_2H_5)$—$CH_2$—$CH_2$—$O$—$CH_2$—$CH=CH_2$, $C_8F_{17}$—$SO_2$—$NH$—$CH_2$—$CH_2$—$O$—$CH_2$—$C(CH_3)=CH_2$, $C_8F_{17}$—$SO_2$—$N(CH_3)$—$CH_2$—$CH_2$—$O$—$CH_2$—$C(CH_3)=CH_2$, $C_8F_{17}$—$SO_2$—$N(C_2H_5)$—$CH_2$—$CH_2$—$O$—$CH_2$—$C(CH_3)=CH_2$, $C_7F_{15}$—$CO$—$NH$—$CH_2$—$CH=CH_2$, $C_8F_{17}$—$SO_2$—$NH$—$CH_2$—$CH_2=CH_2$, $C_nF_{(2n+1)}$—$CH_2$—$CH2$—$S$—$CH=CH2$, wherein n is as previously defined, $(CF_3)_2CF$—$O$—$CH_2$—$CH=CH_2$, and $(CF_3)_2CF$—$O$—$CH_2$—$C(CH_3)=CH_{2l}$ Most preferred of these substituted monomers are the following:

$C_nF_{(2n+1)}$—$CH_2$—$CH_2$—$O$—$CH_2$—$CH=CH_2$, wherein n is as previously defined.

$C_nF_{(2n+1)}$—$CH_2$—$CH_2$—)—$CH_2$—$C(CH_3)$—$CH_2$, wherein n is as previously defined, and $F(CF_2)_n$—$CH_2$—$CH_2=CH_2$ wherein n is as previously defined.

Thus in the terpolymer of Formula I the most preferred $R_f$ is selected from $CF_{(2n+1)}$—$CH_2$—$CH_2$—)—$CH_2$— and $F(CF_2)_n$—$CH_2$—$CH_2$—.

The non-hydrolyzable perfluoroalkyl substituted monomers used in the present invention are either commercially available or are readily prepared using published synthetic procedures. Sources or synthetic references are listed in the materials section.

The alpha-olefin or vinyl ether monomer, non-hydrolyzable perfluoroalkyl substituted monomer, and maleic anhydride are polymerized to form the terpolymer of the present invention. The free-radical terpolymerization is usually carried out in solution using an organic solvent which allows for dissolution of the reactants. However, bulk, suspension, or emulsion polymerization are suitable for use to prepare the desired polymers. Preferred solvents are ketones such as methyl isobutyl ketone and aromatics such as toluene, xylene or cumene. Chain transfer agents such as hydrocarbon or fluorocarbon mercaptans, toluene, xylene, ethylbenzene, cumene or methylene chloride can be used to control the molecular weight. Organic peroxides or azo initiators are used to initiate the polymerization at specific temperatures. For instance, the preferred peroxides are t-butyl peroctoate at 95° C. and LUPERSOL TBIC M75, a t-butylperoxy isopropyl carbonate, at 11 5° C. each available from Elf Atochem North America, Inc., Philadelphia, Pa. The preferred azo initiator is VAZO 67 a 2,2'-azobis(2-methylbutyronitrile) available from E. I. du Pont de Nemours and Company, Wilmington, Del., at 70° C. The conversion of the monomers to polymers is followed by gas chromatography. After completion of polymerization, the polymer is isolated by either stripping of the volatiles or by pouring the reaction product into an incompatible solvent which causes precipitation. The dried polymers are usually amber, brittle resins. The maleic anhydride polymers are then hydrolyzed either as solutions or suspensions in aqueous alkali or ammonia at 40° C. to 85° C., giving rise to yellowish and clear to slightly hazy aqueous solutions after removal of solvents. The aqueous terpolymer solutions are characterized by calculated amounts of active ingredients and by chemical analysis for fluorine content.

The present invention further comprises a method of providing soil resistance and resistance to staining by acid dyes to a fiber substrate comprising application in a single step of an effective amount of composition of a terpolymer having units of Formula I as defined above.

The aqueous terpolymer solutions are applied at levels of 0.3% to 3.0% of active ingredients based on the weight of fiber or fabric at a pH of 1.5 to 6.0 by various methods well known in the art, such as by exhaust as practiced in the batch Beck dyeing of carpets, or by continuous application using "KUSTER" or "OTTING" carpet dyeing equipment. Other suitable methods include, but are not limited to, padding or foam or spray application. A surfactant is used if the application is carried out at the low end of the pH range (i.e., at a pH of 1.5 to 3.0). The amount of surfactant sufficient to retain homogeneous bath solutions, based on the amount of active ingredients of the fluorinated terpolymer, will usually be 10% to 100%, and preferably 20% to 50%. Surfactants which can be used for this application include alpha-olefin sulfonates such as WITCONATE AOS available from Witco Corporation, Greenwich, Conn., alkylated disulfonated diphenyl oxide such as DOWFAX 2A4 available from Dow Chemical, Midland, Mich., or sodium dodecylbenzenesulfonate such as SUL-FON-ATE AA-10 available from Tennessee Chemical Co., Atlanta, Ga., to name only a few.

The aqueous solutions of the fluorine-containing maleic terpolymers are usually applied in such amounts as to yield fibers, fabrics or carpets with from about 50 to about 3,000 ppm of fluorine, and preferably between about 200 to about 1,000 ppm of fluorine. The aqueous terpolymers can also be co-applied with from about 10% to about 70% of other commercial stain resist chemicals based on sulfonated phenol-formaldehyde condensates, polymethacrylic acids, or maleic acid copolymers.

Exhaust or fixation of the stain/soil resists is accomplished by methods well known to those skilled in the art at bath or solution temperatures ranging from 20° C. to 100° C. over a period of a few seconds to one hour, preferably 50° C to 85° C. for 5 seconds to 20 minutes. Often the thus treated fiber or fabric is steamed and/or heat treated to allow for optimum performance. The herein described stain/soil resists are also applied directly in a finish during fiber spinning, twisting or heat setting operation. The stain/soil resists of this invention are also applied in situ, between pH 2 to 10, to polyamide, polyester, polyolefin or wool carpeting which has already been installed in a dwelling place, office or other location. They are applied as a simple aqueous preparation or in the form of aqueous shampoo preparation, with or without one or more polyfluoroorganic oil-, water-, and/or soil-repellent materials.

The present invention further comprises a fiber substrate to which has been applied a composition of a terpolymer having units of Formula I as defined above. Fiber substrates suitable for use herein include polyamide, polyester, polyolefin and wool fibers or carpets. Particular polyamides include nylon, such as nylon-6, nylon 6-6, and producer-colored nylon (where the color is a pigment incorporated into the fiber during spinning). Application of the terpolymer composition provides by soil resistance and resistance to staining by acid dyes to the fiber substrate in a single application step.

APPLICATION AND TEST METHODS

Application Method 1

A white cut-pile carpet sample, cut by weight (5 g) and constructed from 29 oz/square yard (983 g/m$^2$) Superba-set BCF nylon 6/6, was treated in a laboratory Beck-type apparatus for 10 minutes at 80° C. at a 20:1 liquor-to-goods ratio with a solution of a stain resist agent (stain resist agents are described in the examples) at a pH of 2 to give an application load of 0.8% of weight fiber (owf) based on the weight of the maleic anhydride copolymer before hydrolysis. A surfactant (0.02 g) such as DOWFAX 2A4 or WITCONATE AOS was added before pH adjustment. The carpet was then rinsed under tap water, partially de-watered by squeezing and dried in an forced-air oven for about 20 minutes at 121° C. (250° F.).

Application Method 2

Carpet was moved through a Kuesters' FLEXNIP trough (Zima Corp., Spartanburg, S.C.) containing an aqueous solution of stain resist chemicals to provide typically for a wet-pick-up of 250% to 300%. The bath concentration and wet-pick-up were adjusted to give a concentration of about 0.8% of stain resist chemical active ingredient based on the weight of dried carpet fiber. To the aqueous stain resist bath was added about 50% of a surfactant (DOWFAX 2A4 or WITCONATE AOS) on the weight of stain resist active ingredient before adjusting the pH to 2 with AUTOACID-A-10 available from Peach State Labs, Rome, Ga. After passing through the liquid application equipment, the carpet was steamed, vacuum extracted and finally oven dried near 132° C. (220° F.) for about 60 seconds.

Test Method-Stain Test 1

A carpet specimen (1.5×3.5 inch, 3.8×8.9 cm) was placed pile up on a flat non-absorbent surface. Ten milliliters of an aqueous red dye solution (0.1 g Red Dye No. 40 and 3.2 g citric acid in a volume of 1 L) was poured into a 1-inch (2.54 cm) diameter cylinder which was placed tightly over the specimen. The cylinder was removed after all the liquid had been absorbed. The stained carpet specimen was left undisturbed for 24 hours, after which it was rinsed thoroughly under cold tap water and squeezed dry. The color of the specimen was measured with a Minolta Chroma Meter CR 200 available from Minolta Corporation, Ramsey, N.J., by determining the color difference "Delta a" between unstained and stained carpet. Values of "a" are measured according to the manufacturer's directions. The higher the "Delta a" the redder the stain.

Test Method 2-Stain Test 2

Acid dye stain resistance was evaluated using a modified procedure based on the American Association of Textile Chemists and Colorists (AATCC) Method 175-1991, "Stain Resistance: Pile Floor Coverings." A staining solution was prepared by mixing cherry-flavored KOOL-AID powder (from Kraft/General Foods, White Plains, N.Y., a powdered drink mix sold under the trademark KOOL-AID sweetened with sugar and containing, inter alia, FD&C Red No. 40) with water according to the preparation instructions on the KOOL-AID container. The carpet sample to be tested was placed on a flat non-absorbent surface and a hollow plastic cylinder having a 2 inch (5.1 cm) diameter was placed tightly over the carpet sample. Twenty ml of the KOOL-AID staining solution was poured into the cylinder and the solution was allowed to absorb completely into the carpet sample. The cylinder was then removed and the stained carpet sample was allowed to sit undisturbed for 24 hours, after which it was rinsed thoroughly under cold tap water, and oven dried at 150° F. (66° C.).

The carpet sample was then visually inspected and rated for staining according to the FD&C Red No. 40 Stain Scale described in AATCC Method 175-1991. The stain rating of 10 is excellent, showing outstanding stain resistance, whereas 1 is the poorest rating, comparable to an untreated or control sample.

Test Method 3-Shampoo Test (Wash Durability)

The carpet specimen was submerged for 5 minutes at room temperature in a detergent solution consisting of DUPONOL WAQE, a sodium alkane sulfonate surfactant available from Witco Corporation, Greenwich, Conn. (2.0 oz/gal., 15 g/L). The solution was adjusted with dilute sodium carbonate to a pH of 10. The specimen was then removed, rinsed thoroughly under tap water, de-watered by squeezing, and oven dried at 150° F. (66° C.). The dry carpet specimen was then tested according to Stain Test Method 2, as described above.

Test Method 4-Soil Test 1 (Accelerated Drum Test)

Carpet specimens (1.5×3.5 inch, 3.8×8.9 cm) were mounted pile up with 2-sided adhesive tape onto the inside of a metal drum (diameter 8 inch, 20.3 cm) until the inside surface was completely covered by carpet. Into the drum was then placed a volume of 250 ml of dirty SURLYN ionomer resin pellets, made by blending 1liter volume SURLYN 8528 ionomer resin pellets, ethylene/methacrylic acid copolymers as partial sodium or zinc salts available from E. I. du Pont de Nemours and Company, Wilmington, Del. with 20 g of synthetic soil (AATCC Method 123-1988), and 250 ml volume of 5/16 inch (0.79 cm) ball bearings. The drum was then closed and rolled on a roller-type drum mill for 3 minutes. The carpet samples were then removed from the drum and cleaned with a canister-type vacuum cleaner.

The degree of soiling was measured with a Minolta Chroma Meter CR 200 by determining the difference in darkness as "Delta E" between the unsoiled control and the soiled carpet sample. Values of "E" are measured according to the manufacturer's directions. A "Delta E" unit of 1 is significant when compared to visual evaluation. The lower the "Delta E" value, the lower the soiling.

Test Method 5-Soil Test 2 ( Walk-On Test)

Treated and untreated carpet samples were placed on the floor at a high pedestrian location and allowed to be soiled by normal foot traffic. The amount of foot traffic was monitored and soiling was determined after 23,000 and 81,000 foot-traffics as "Delta F" using a Minolta Chroma Meter CR-200 available from Minolta Corp., Ramsey, N.J. The "foot-traffic" unit is commonly used in this context, representing the electronically-counted number of pedestrian passes over the sample. "Delta E" represents the value of the soiled carpet sample relative to its unsoiled (no traffic) counterpart.

MATERIALS

The following materials are used in the Examples hereinafter.

1. AUTOACID-A-10 (a proprietary formulation based on U.S. Pat. No. 5,234,466, from Peach State Labs., Rome, Ga.).
2. t-BUTYL PEROCTOATE (t-butylperoxy-2-ethylhexanoate from Elf Atochem North America Inc., Philadelphia, Pa.).
3. DOWFAX 2A4 (disulfonated alkyl diphenyl oxide from Dow Chemical, Midland, Mich.).
4. DUPONOL WAQE (a sodium alkane sulfonate surfactant from Witco Corp., Greenwich, Conn.).
5. ERIONAL Phenolic novolac resin (from Ciba Corp., Greensboro, N.C.).
6. LUPERSOL TBIC M75 (t-butylperoxy isopropyl carbonate from Elf Atochem North America Inc., Philadelphia, Pa.).
7. Monomeric n-butyl vinyl ether, 1-octene, maleic anhydride, and styrene were obtained from Aldrich Chemical Co., Milwaukee, Wis.
8. SMA Resin 1000 (a styrene/maleic anhydride resin from Elf Atochem North America Inc., Philadelphia, Pa.).
9. SUL-FON-ATE AA-10 (sodium dodecylbenzenesulfonate from Tennessee Chemical Co., Atlanta, Ga.).
10. SURLYN 8528 (ethylene/methacrylic acid copolymers as their partial sodium or zinc salts, from E. I. du Pont de Nemours and Co., Inc., Wilmington, Del.).
11. VAZO 67 [2,2'-azobis(2-methylbutyronitrile) from E. I. du Pont de Nemours and Co., Inc., Wilmington, Del.].
12. WITCONATE AOS (sodium C14- 16 olefin sulfonate from Witco Corp., Greenwich, Conn.).

Non-Hydrolyzable Fluoromonomers 1. 1H, 1H, 2H-Perfluoro-l-alkene, $R_fCH=CH_2$, is available as ZONYL B OLEFIN from E. I. du Pont de Nemours and Co. Inc., Wilmington, Del.
2. IH, 1H, 2H, 3H, 3H-Perfluoro-1-alkene, $R_fCH_2-CH=CH_2$, was prepared according to the procedures described by G. P. Gambaretto, et al., J. Fluorine Chem. (1997), 84, 101–102
3. 8-Perfluorodecyloctene-1, $C_{10}F_{21}(CH_2)_6-CH=C_2$, wasprepared according to the procedures described by S. J. McLain, et al., Macromolecules (1996), 29, 8211–8219.
4. Perfluoroalkyl vinyl ether, $R(CH_2)_2-O-CH=CH_2$, was prepared according to the procedure described by P. Tarrant, et al., J. Org. Chem. (1963), 29, 1198.
5. Pedfluoroalkyl allyl ether, $R_fCH_2)_2-O-CH_2-CH=CH_2$, was prepared according to the procedure described by B. Boutevin, et al., J. Fluorine Chem. (1987), 35, 399–410.
6. N-Allyl perfluorooctanesulfonamide, $C_8F_{17}-SO_2-NH-CH_2-CH=CH_2$, was prepared according to the procedure described by R. J. Gamble, et al., in U.S. Pat. No. 5,348,769.
7. N-Allyl perfluorooctaneamide, $C_7F_{15}-C(O)-NH-CH_2-CH=CH_2$, was synthesized by reacting 99.5 g (0.23 mole) of perfluorooctanoyl chloride (available from PCR, Inc., Gainesville, Fla.) with 28.5 g (0.5 mole) of allylamine in diethyl ether at 10° C. After removal of the solids by filtration, the organic solution was washed with distilled water and concentrated. The residue was fractionated at reduced pressure to give a colorless, glassy solid, boiling at about 100° C. at 3 Pa pressure and melting at 39–41° C.

EXAMPLES

Comparative Example A

Comparative Example A is a prior art non-fluorinated octene/maleic acid stain resist agent as described in U.S. Pat. No. 5,654,068 as follows:

Forty grams of a copolymer of 1-octene with maleic anhydride having a number average molecular weight of 1340 by Gel Permeation Chromatography (GPC) and a composition of 1-octene to maleic anhydride of 0.53 to 1.0 by $^{13}C$ NMR was hydrolyzed at 80° C. under agitation with a solution of 7.6 g sodium hydroxide in 112.4 g deionized water. The resulting clear amber solution (160 g) contained 25% of active ingredients (AI).

79.2 g of the 25% AI solution of 1-octene/maleic acid was blended with 11.2 g of "Dowfax" 2A4 (Dow Chemical Co.), 30.6 g of deionized water, and 16.5 g of "Erional" LY (30% active ingredients), a sulfonated hydroxyaromatic formaldehyde condensation product available from Ciba-Geigy Corp. The final blend contained 18% active ingredients consisting of 80% by weight of 1 -octene/maleic acid and 20% by weight of "Erional" LY.

Comparative Example B

Comparative Example B is a hydrolyzed fluorinated maleic anhydride soil resist agent similar to those described in U.S. Pat. No. 4,029,867. A solution of 14.7 g (0.15 mole) maleic anhydride, 50.4 g (0.10 mole) allyl 1H,1H,2H, 2H-perfluorodecyl ether, and 0.05 g 1 -dodecanethiol in 60 g methyl isobutyl ketone was heated under agitation and nitrogen to 95° C. To the clear solution was slowly added over a 2 hour period 2 ml t-butyl peroctoate initiator using a syringe pump. No non-hydrolyzable fluoromonomer was detected after 17 hours by gas chromatographic (GC) analysis. All volatiles were then removed on a rotary evaporator at 80° C. to 90° C. under reduced pressure (10 to 20 Pa) to give 65.5 g of an amber, brittle resin, melting at 145° C. to 166° C. with a number average molecular weight of 3,450. Twenty grams of the above resin were hydrolyzed at 70° C. to 80° C. with 80 g of 3.1% sodium hydroxide to give 100 g of an amber, clear solution containing 20% active ingredients and 8.7% of fluorine.

Comparative Example C

Comparative Example C is a hydrolyzed copolymer of maleic anhydride with N-allyl perfluorooctanamide ($C_7F_{15}CONHCH_2CH=CH_2$). A solution of 9.8 g (0.1 mole) maleic anhydride, 25.5 g (0.0562 mole) $C_7F_{15}CONHCH_2CH=CH_2$, and 0.2 g 1-dodecanethiol in 50 g methyl isobutyl ketone was heated under agitation and nitrogen to 95° C. t-Butyl peroctoate (1.7 ml) initiator was added over a half hour period using a syringe pump. After 24 hours less than 5% of monomers were detected by GC analysis. The product was then cooled to 70° C. and hydrolyzed with 100 g of a 4% sodium hydroxide solution. The reaction mixture was held for 3 hours at 75° C. to allow for complete hydrolysis of the polymeric anhydride. After adjusting the pH to 6.9, the solvent was stripped at 60° C. to 70° C. and 50 to 100 Pa to give a clear aqueous solution containing 7.0% of fluorine.

Comparative Example D

Comparative Example D is a prior art stain resist example of a blend of a hydrolyzed styrene/maleic anhydride copolymer SMA-1000 with a phenol-formaldehyde copolymer as described in U.S. Pat. No. 4,883,839, Example 2 as follows.

In a 7 gallon paste pail, 4800 gms of a 1/1 molar styrene/maleic anhydride copolymer having a number average molecular weight of 1600 (SMA® 1000 from Sartomer) were stirred into 3000 gms deionized water to give a smooth slurry. It dispersed well (no exotherm) in about 15 minutes. Then over about 1 hour, 5400 gms of 30% NaOH were added. The reactor was cooled during addition to maintain temperature in the 30° C. to 40° C. range. If the temperature went over about 40° C., addition of caustic solution was stopped. (Above 45° C., the polymer may melt and coagulate into large sticky globs which are very slow to hydrolyze.) After all of the NaOH solution has been added, the reaction mass was stirred for 15 minutes, then the reactor was heated to 70° C. and stirred for 3 hours. Heating was stopped, and 2800 gms of deionized water was added with stirring, followed by cooling to 50° C. A light yellow, slightly viscous, clear alkaline solution of a polysodium salt of styrene/maleic acid copolymer was obtained.

The following composition was prepared:

| Ingredient | % |
|---|---|
| Water | 42.1 |
| SMAC | 9.3 |
| $NaC_{12}SO_4$ | 16.5 |
| PGME | 9.1 |
| DPM | 9.1 |
| Fluorosurfactant | 3.9 |
| SPFCAD | 10.0 |
| Total | 100.0 |

SMAC: 30 parts styrene/maleic anhydride copolymer (ARCO SMA® 1000 resin), 36.2 parts water, 33.8 parts 30% NaOH combined and heated to hydrolyze the resin per the procedure described above.
$NaC_{12}SO_4$: 30% aqueous sodium lauryl sulfate.
PGME: Propylene glycol monomethyl ether.
DPM: Dipropylene glycol monomethyl ether.
Fluorosurfactant: A mixture of Li fluoroalkyl mercapto propionate and diethanolammonium fluoroalkyl phosphate in a 1.0:1.1 ratio.
SPFCAD: in parts by weight, 29 parts of a sulfonated phenol-formaldehyde condensate, 44.5 parts of ethylene glycol, 21 parts of water, 4 parts of inorganic salts and 1.5 parts of acetic acid.

Example 1

A solution of 19.6 g (0.2 mole) maleic anhydride, 19.8 g (0.19 mole) styrene, 5.0 g (0.01 mole) allyl 1H,1H,2H,2H-perfluorodecyl ether in 100 g cumene was heated under agitation to 65° C. before the addition of 0.3 g VAZO 67 initiator. The solution became cloudy and an exotherm caused the temperature to rise to 75° C. To the viscous reaction mass was added after 3 hours 42 g cumene and 0.3 g VAZO 67 and agitation was continued at 70° C. for another 2 hours. The reaction product was then poured into methanol, separated by filtration, and air dried giving an amber, brittle resin melting at 155° C. to 170° C. with a number average molecular weight of 5,960 by gel permeation chromatography (GPC) and a fluorine content of 0.47%. The low fluorine content indicated that only a small amount of the non-hydrolyzable fluoromonomer was incorporated into the polymer. Twenty grams of the above maleic anhydride resin was hydrolyzed with 80 g of 5% sodium hydroxide at 70° C. and gave a clear solution containing 13.3% active ingredients and 0.024% of fluorine.

Example 2

A solution of 29.4 g (0.3 mole) maleic anhydride, 30.1 g (0.3 mole) n-butyl vinyl ether, 5.1 g (0.01 mole) allyl 1H,1H,2H,2H-perfluorodecyl ether and 0.5 g 1-dodecanethiol in 75 g methyl isobutyl ketone was heated under agitation and nitrogen to 95° C. To the clear solution was slowly added 1 ml t-butyl peroctoate using a syringe pump over a half hour period. Analysis (GC) after 5 hours indicated absence of maleic anhydride. The reaction product was the stripped to dryness at 80° C. to 90° C. under reduced pressure (10 to 20 Pa) and gave an amber, brittle resin melting at 160° C. to 175° C. with a number average molecular weight of 12,000 (GPC). Thirty grams of above resin was hydrolyzed at 80° C. with 120 g of 5% sodium hydroxide and gave a yellow, clear solution containing 20% active ingredients and 0.92% of fluorine.

Example 3

A solution of 19.2 g (0.195 mole) maleic anhydride, 7.5 g (0.0667 mole) 1-octene, 30.9 g (0.00667 mole) allyl 1H,1H,2H, 2H-perfluoroalkyl(C8/C10/C12/C14) ether, and 0.2 g 1-dodecanethiol in 45 g methyl isobutyl ketone was heated under agitation and nitrogen to 95° C. To the clear solution was slowly added over a 2 hour period 2.5 ml t-butyl peroctoate initiator using a syringe pump. Analysis (GC) after 5 hours indicated absence of maleic anhydride. The reaction product was then stripped to dryness at 80° C. to 90° C. under reduced pressure (10 to 20 Pa) and gave an amber, brittle resin melting at 125–133° C. with a number average molecular weight of 2,120. Twenty grams of the above anhydride resin was hydrolyzed at 75° C. to 85° C. with 80 g 3.7% sodium hydroxide and gave a clear, yellow solution containing 20% active ingredients and 4.8% of fluorine.

Example 4

A solution of 25.8 g (0.263 mole) maleic anhydride, 18.5 g (0.165 mole) 1-octene, 8.0 g (0.0159 mole) allyl 1H,1H, 2H,2H-perfluorodecyl ether, and 0.4 g 1-dodecanethiol in 60 g methyl isobutyl ketone was heated under agitation and nitrogen to 95° C. To the clear solution was slowly added over a 2 hour period 3.5 ml t-butyl perocotate initiator using a syringe pump. Analysis (GC) after 17 hours indicated absence of monomers. The reaction product was then stripped to dryness at 80° C. to 90° C. under reduced pressure (10 to 20 Pa) and gave an amber, brittle resin melting at 119° C. to 133° C. with a number average molecular weight of 4,810. Ten grams of the above anhydride was hydrolyzed at 40° C. with 40 g of 5% ammonium hydroxide and gave a yellowish, clear solution containing 20% active ingredients and 1.6% of fluorine.

Example 5

A solution of 24.7 g (0.252 mole) maleic anhydride, 18.5 g (0.165 mole) 1-octene, 4.0 g (0.008 mole) allyl lH,lH,2H,2H-perfluorodecyl ether, and 0.3 g 1-dodecanethiol in 60 g methyl isobutyl ketone was heated under agitation and nitrogen to 95° C. To the clear solution was slowly added over a 2 hour period 3.5 ml t-butyl perocotate initiator using a syringe pump. Analysis (GC) after 17 hours indicated absence of maleic anhydride. The reaction product was then stripped to dryness at 80° C. to 90° C. under reduced pressure (10 to 20 Pa) and gave an amber, brittle resin melting at 120° C. to 135° C. with a number average molecular weight of 3,230. Twenty g of the above anhydride polymer was hydrolyzed at 75° C. with 80 g 4.8% sodium hydroxide and gave a yellowish, clear solution containing 20% active ingredients and 0.43% of fluorine.

Example 6

A solution of 29.8 g (0.3 mole) maleic anhydride, 21.3 g (0.19 mole) 1-octene, 16.2 g (0.03 mole) N-allyl perfluorooctane-sulfonamide ($C_8F_{17}SO_2NHCH_2CH=CH_2$), and 0.6 g 1-dodecanethiol in 60 g methyl isobutyl ketone was heated under agitation and argon to 95° C. To the clear solution was slowly added over a 3 hour period 5 ml t-butyl perocotate initiator using a syringe pump. Analysis (GC) after 18 hours indicated absence of maleic anhydride. A part of the reaction product was then stripped to dryness at 80° C. to 90° C. under reduced pressure (10 to 20 Pa) and gave an amber, brittle resin melting at 130° C. to 140° C with a number average molecular weight of 3,490. The methyl isobutyl ketone solution of the above reaction product was heated with 162 g 7.4% sodium hydroxide for 3 hours at 75° C. Stripping the solvent/water azeotrope at 60° C. to 70° C. under reduced pressure (100 to 150 Pa) gave a yellow, clear solution containing 25.7% active ingredients and 2.0% of fluorine.

Example 7

A solution of 29.4 g (0.3 mole) maleic anhydride, 21.3 g (0.19 mole) 1-octene, 12.1 g (0.0266 mole) N-allyl perfluoro-octanamide ($C_7F_{15}CONHCH_2CH=CH_2$), and 0.6 g 1-dodecanethiol in 60 g methyl isobutyl ketone was heated under agitation and nitrogen to 95° C. To the clear solution was added over a 3 hour period 5 ml t-butyl perocotate using a syringe pump. Analysis (GC) after 22 hours detected no maleic anhydride. A part of the reaction product was the stripped to dryness at 80° C., to 90° C. under reduced pressure (10 to 20 Pa) and gave an amber, brittle resin with a number average molecular weight of 3,350. The methyl isobutyl ketone solution (109 g) of the above reaction product was heated with 112 g 10.7% sodium hydroxide for 3 hours at 60° C. to 70° C. Stripping of the solvent/water azeotrope at 60° C. to 70° C. under reduced pressure (100 to 150 Pa) gave a yellow, slightly hazy solution containing 22.1% active ingredients and 1.9% of fluorine.

Example 8

A solution of 294 g (3 moles) maleic anhydride, 177 g (1.58 moles) 1-octene, 167 g (0.45 mole) 1 H, 1 H,2H-perfluoro-1-alkene(a mixture of C8/C10/C12/C14) in 600 g methyl isobutyl ketone was heated under agitation and argon to 95° C. To the clear solution was added over a 7 hour period 20 ml of LUPERSOL TBIC M75 initiator. After 20 hours another 20 ml of initiator was added within 7 hours. Analysis (GC) after a 68 hour reaction time indicated complete reaction of maleic anhydride and octene. The reaction product was then stripped to dryness at 80° C. to 90° C. at reduced pressure (5 to 10 Pa) and gave an amber, brittle resin. The maleic anhydride resin (566 g) was hydrolyzed at 75° C. with 1700 g 6.5% sodium hydroxide to give a yellowish slightly hazy solution containing 25% active ingredients and 0.85% of fluorine.

Example 9

A solution of 29.4 g (0.3 mole) maleic anhydride, 17.7 g (0.158 mole) 1-octene, 12.2 g (0.03 mole) 1H,1H,2H,3H,3H-perfluoro-I-alkene (a mixture of C9/C11/C13/C15) in 60 g methyl isobutyl ketone was heated under agitation and argon to 95° C. To the clear solution was added over a 2-hour period 5 ml of LUPERSOL TBIC M75 initiator. Analysis (GC) after a 46-hour reaction time indicated complete reaction of maleic anhydride and octene. The reaction product was then stripped to dryness at 80° C. to 90° C. at reduced pressure (5 to 10 Pa) and gave an amber, brittle resin. The maleic anhydride polymer (50 g) was hydrolyzed at 85° C. with 150 g 5% sodium hydroxide and gave a yellow, slightly hazy solution containing 25% active ingredients and 1.5% of fluorine.

Example 10

A solution of 22.0 g (0.225 mole) maleic anhydride, 13.3 g (0.1185 mole) 1-octene, 14.2 g (0.0225 mole) 1H,1H,2H,3H,3H,4H,4H,5H,5H,6H,6H,7H,7H,8H,SH-perfluoro-1-octadecene in 45 g methyl isobutyl ketone was heated under agitation and argon to 95° C. To the clear solution was added over a 2 hour period 5 ml of LUPERSOL TBIC M75 initiator. Analysis (GC) after 24 hours indicated no residual monomers. The reaction product was then stripped to dryness at 80° C. to 90° C. at reduced pressure (5 to 10 Pa) and gave an amber, brittle resin melting at 1 15° C. to 127° C. The maleic anhydride polymer (45 g) was hydrolyzed at 85° C. with 135 g 4.4% sodium hydroxide and gave a clear, yellowish solution containing 25% active ingredients and 3.3% of fluorine.

Example 11

A solution of 263.0 g (2.68 moles) maleic anhydride, 207.5 g (1.85 moles) 1-octene, 25.6 g (0.0488 mole) N-allyl perfluorooctanesulfonamide, 12.2 g (0.03 mole) N-allyl perfluoro-octanamide, and 16.5 g lH,lH,2H,2H-perfluorodecylthiol in 492 g methyl isobutyl ketone was heated under agitation and nitrogen to 95° C. To the clear solution was added over a 2 hour period 38 ml of t-butyl perocotate initiator. Analysis (GC) after 21 hours indicated absence of maleic anhydride. A small part of the reaction product was stripped to dryness at 70° C. to 80° C. under reduced pressure and gave an amber, brittle resin, melting at 126° C. to 137° C. with a number average molecular weight of 3,650 (GPC). The remaining reaction product (1033 g) was hydrolyzed at 65° C. with 1982 g 5.4% sodium hydroxide for 3 hours. The solvent/water azeotrope was then removed at 65° C. under reduced pressure (100 to 150 Pa) and gave a yellow, slightly hazy solution containing 22.0% active ingredients and 0.95% of fluorine. The above solution (2,375 g) was blended with a commercial sulfonated aromatic condensate ERIONAL LY (435 g) available from Ciba Corporation, Greensboro, N.C. and tested as stain/soil resist (Table 2).

Example 12

A solution of 294 g (3 moles) maleic anhydride, 221 g (1.97 moles) 1-octene, 47.7 g 97.8% (0.0985 mole) allyl 1H,1H,2H,2H-perfluoroalkyl (C8/C10/C12/C14) ether, 6.0 g 1-dodecanethiol in 500 g methyl isobutyl ketone was heated under agitation and nitrogen to 95° C. To the clear solution was added in one hour period 42 ml t-butyl peroctoate initiator using a syringe pump. Analysis (GC) after 21 hours indicated absence of maleic anhydride. A small amount of the product was stripped to dryness at 80° C. to 90° C. under reduced pressure (10 to 20 Pa) and gave an amber, brittle resin with a number average molecular weight of 3,600. The remaining product was hydrolyzed at 85° C. for 3 hours with 2220 g 5.4% sodium hydroxide before removing the solvent/water azeotrope at 65° C. under reduced pressure (100 to 150 Pa) and gave a yellowish, clear solution containing 22.0% active ingredients and 0.65% of fluorine. The above solution (2,697 g) was blended with a commercial sulfonated aromatic condensate ERIONALLY (494 g) as in Example 11 and tested as stain/soil resist (Table 2).

TABLES

Table 1 compares the performance of Examples 1 through 10 as stain/soil resist agents versus prior art stain or soil resist agents illustrated by Comparative Examples A through C. Table 2 compares the performance of the prior art conventional non-fluorinated stain resist of Comparative Example D with the performance of Examples 11 and 12.

Performance of Carpet Treated with Maleic Acid Polymers (Application Method 1)

| Carpet Treatment | Mole of Monomer(s) per Mole of Maleic Anhydride | | ppm F (a) | Stain Test 1 Delta A | Soil Test 1 Delta E |
|---|---|---|---|---|---|
| | Hydrocarbon | Fluorocarbon* | | | |
| Untreated | — | — | 0 | 40.9 | 35 |
| Comparative Example A | 0.69 Octene | — | 0 | 4.5 | 28 |
| Comparative Example B | — | 0.67 FM1 | 580 | 37.0 | 13 |
| Comparative Example C | — | 0.56 FM2 | 2550 | 41.3 | 14 |
| Example 1 | 0.95 Styrene | 0.05 FM1 | 80 | 8.7 | 27 |
| Example 2 | 1.0 Butyl vinyl ether | 0.03 FM1 | 140 | 2.0 | 21 |
| Example 3 | 0.34 Octene | 0.34 FM3 | — | 26.2 | 18 |
| Example 4 | 0.63 Octene | 0.06 FM1 | 190 | 3.4 | 21 |
| Example 5 | 0.65 Octene | 0.03 FM3 | 140 | 4.3 | 21 |
| Example 6 | 0.63 Octene | 0.10 FM4 | 280 | 6.0 | 19 |
| Example 7 | 0.63 Octene | 0.09 FM2 | 780 | 7.0 | 18 |
| Example 8 | 0.53 Octene | 0.15 FM5 | 330 | 2.9 | 24 |
| Example 9 | 0.53 Octene | 0.10 FM6 | 460 | 1.6 | 22 |
| Example 10 | 0.53 Octene | 0.10 FM7 | 170 | 4.5 | 20 |

(a) ppm fluorine by analysis.

Performance of Carpet Treated with Maleic Acid Polymers (Application Method 1)

| Carpet Treatment | Mole of Monomer(s) per Mole of Maleic Anhydride | | ppm F | Stain Test 1 | Soil Test 1 |
|---|---|---|---|---|---|
| | Hydrocarbon | Fluorocarbon* | (a) | Delta A | Delta E |

*Non-hydrolyzable fluoromonomers:
FM1, $C_8F_{17}(CH_2)_2$—O—$CH_2CH$=$CH_2$
FM2, $C_7F_{15}CONH$—$CH_2CH$=$CH_2$
FM3, $CnF_{(2n+1)}(CH_2)_2$—O—$CH_2CH$=$CH_2$ (n = 6, 8, 10, and 12)
FM4, $C_8F_{17}SO_2NH$—$CH_2CH$=$CH_2$
FM5, $CnF_{(2n+1)}CH$=$CH_2$
FM6, $CnF_{(2n+1)}CH_2CH$=$CH_2$
FM7, $C_{10}F_{21}(CH_2)_6$—CH=$CH_2$.

TABLE 2

Performance of Carpet Treated With Maleic Acid Polymers (Application Method 2)

| Test 2* Treatment | Mole of Monomer(s) per Mole of Maleic Anhydride | | Stain Test 2 ("Delta a") | | Soil ("Delta E") Carpet | |
|---|---|---|---|---|---|---|
| | Hydrocarbon | Fluorocarbon** | 24 Hr. | Shampoo | 23M | 81M |
| Untreated | — | — | 1 | 1 | 8.6 | 13.6 |
| Comparative Example D | 1.20 Styrene | — | 8 | 6 | 6.1 | 12.4 |
| Example 11 | 0.69 Octene | 0.018 FM4 0.011 FM2 | 8 | 8 | 6.5 | 11.4 |
| Example 12 | 0.66 Octene | 0.033 FM3 | 8 | 7 | 5.5 | 10.6 |

Fluorine found by analysis:
Example 11, 323 ppm.
Example 12, 252 ppm.
*23M represents 23,000 foot-traffics and 81M represents 81,000 foot-traffics, see Soil Test 2 description.
**See footnote to Table 1 for non-hydrolyzable fluoromonomer compositions

We claim:

1. A composition comprising a terpolymer having units of Formula I

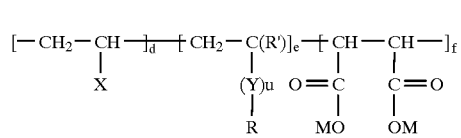

wherein

X is a $C_{2-10}$ alkyl, $C_{6-12}$ aryl, or $C_{4-12}$ alkoxy radical, d is from about 3 to about 50, R is a fluoroalkyl radical $R_f$—$(A)_v$—$(B)_w$—, $R_f$ is a fully fluorinated straight or branched aliphatic radical optionally interrupted by at least one oxygen atom, A is a divalent radical selected from —$SO_2N(R'')$—, —$CON(R'')$—, —S—, or —$SO_2$—, where R" is H, or a $C_{1-6}$ alkyl radical, B is a divalent linear hydrocarbon radical —$C_tH_{2t}$—, where t is 1 to 12, Y is a divalent radical —$CH_2$—O—, u, v, and w are each independently zero or 1, R' is hydrogen or methyl, e is from about 0.05 to about 10, M is hydrogen, alkali metal, or ammonium, and f is from about 5 to about 40.

2. The composition of claim 1 prepared by polymerization of an alpha-olefin or a vinyl ether, a non-hydrolyzable perfluoroalkyl substituted monomer, and maleic anhydride in a molar ratio of alpha-olefin or alkyl vinyl ether to maleic anhydride of from about 0.6:1 to about 1.2:1.

3. The composition of claim 2 wherein the molar ratio of non-hydrolyzable perfluoroalkyl substituted monomer to maleic anhydride is from about 0.01:1 to about 0.25:1.

4. The composition of claim 1 wherein R is $R_f-(A)_v-(B)_w-$ and $R_f$ is a fully fluorinated aliphatic radical having 1 to 30 carbon atoms.

5. The composition of claim 1 wherein R is $F(CF_2)n-CH_2-CH_2-$.

6. The composition of claim 1 wherein d is from about 5 to about 15, e is from about 0.1 to about 3, and f is from about 7 to about 20.

* * * * *